United States Patent
Kim et al.

(10) Patent No.: US 11,200,579 B2
(45) Date of Patent: Dec. 14, 2021

(54) APPARATUS FOR AUTHENTICATION AND PAYMENT BASED ON WEB, METHOD FOR AUTHENTICATION AND PAYMENT BASED ON WEB, SYSTEM FOR AUTHENTICATION AND PAYMENT BASED ON WEB AND NON-TRANSITORY COMPUTER READABLE STORAGE MEDIUM HAVING COMPUTER PROGRAM RECORDED THEREON

(71) Applicant: Eleven Street Co., Ltd., Seoul (KR)

(72) Inventors: Pil Sung Kim, Seoul (KR); Se Il Oh, Seoul (KR); Hyeong Moon Kang, Seoul (KR); Joo Won Lee, Seoul (KR)

(73) Assignee: Eleven Street Co., Ltd., Seoul (KR)

( * ) Notice: Subject to any disclaimer, the term of this patent is extended or adjusted under 35 U.S.C. 154(b) by 1581 days.

(21) Appl. No.: 14/877,566

(22) Filed: Oct. 7, 2015

(65) Prior Publication Data

US 2016/0189156 A1   Jun. 30, 2016

(30) Foreign Application Priority Data

Dec. 24, 2014  (KR) .................. 10-2014-0188321

(51) Int. Cl.
*G06Q 20/24*   (2012.01)
*G06Q 20/40*   (2012.01)

(52) U.S. Cl.
CPC ......... *G06Q 20/409* (2013.01); *G06Q 20/24* (2013.01); *G06Q 20/4012* (2013.01); *G06Q 2220/00* (2013.01)

(58) Field of Classification Search
None
See application file for complete search history.

(56) References Cited

U.S. PATENT DOCUMENTS

| 2008/0208697 A1* | 8/2008 | Kargman ............... G06Q 20/24 705/17 |
| 2010/0202606 A1* | 8/2010 | Almeida ................. H04L 9/065 380/28 |

(Continued)

FOREIGN PATENT DOCUMENTS

| CN | 1394409 A | 1/2003 |
| KR | 100521752 | 10/2005 |

(Continued)

OTHER PUBLICATIONS

Kim, S ; Oh, H , A new electronic check system with reusable refunds, International journal of information security, Nov. 2002, Berlin Heidelberg: Springer-Verlag, vol. 1 (3), p. 175-188.*

(Continued)

*Primary Examiner* — Isidora I Immanuel
(74) *Attorney, Agent, or Firm* — Fenwick & West LLP

(57) ABSTRACT

The present invention provides that a credit card authentication value is divided into meaningless information block 1 and information block 2, the information block 1 can be transmitted to a user authentication device that is physically insulated, and the user authentication device that encodes the information block 1 on the basis of payment PIN information received from user equipment and keeps the encoded information block 1, and decodes the encoded information block 1 on the basis of the payment PIN information and transmits the information block 1 to the credit card permission request device, when there is a request from the credit card permission request device, thereby determining whether there is forgery in payment on a web. Accordingly, security in payment can be improved.

6 Claims, 6 Drawing Sheets

(56) References Cited

U.S. PATENT DOCUMENTS

2013/0212026 A1* 8/2013 Powell ............... G06Q 20/4012
                                                              705/71
2015/0206137 A1* 7/2015 Mazarim Fernandes ....................
                                                         G06Q 20/023
                                                              705/65

FOREIGN PATENT DOCUMENTS

| KR | 10-2009-0124137 A | | 12/2009 | |
|---|---|---|---|---|
| KR | 10-2013-0136606 A | | 12/2013 | |
| KR | 20130136606 A | * | 12/2013 | ............... H04B 5/02 |
| WO | WO-2013/155627 A1 | | 10/2013 | |

OTHER PUBLICATIONS

China National Intellectual Property Administration, Office Action, CN Patent Application No. 201510632184.8, dated Sep. 8, 2020, 25 pages.

Korean Intellectual Property Office, Office Action, KR Patent Application No. 10-2014-0188321, dated Apr. 14, 2021, 11 pages.

* cited by examiner

APPARATUS FOR AUTHENTICATION AND PAYMENT BASED ON WEB, METHOD FOR AUTHENTICATION AND PAYMENT BASED ON WEB, SYSTEM FOR AUTHENTICATION AND PAYMENT BASED ON WEB AND NON-TRANSITORY COMPUTER READABLE STORAGE MEDIUM HAVING COMPUTER PROGRAM RECORDED THEREON

CROSS-REFERENCE TO RELATED APPLICATION

This application claims the benefit of Korean Application No. 10-2014-0188321 filed on Dec. 24, 2014 with the Korean Intellectual Property Office, the disclosure of which is incorporated herein by reference.

BACKGROUND OF THE INVENTION

1. Field of the Invention

The present invention relates to an apparatus for authentication and payment based on a web, a method for authentication and payment based on a web, a system for authentication and payment based on a web, and a non-transitory computer readable storage medium having a computer program recorded thereon, particularly, to an apparatus for authentication and payment based on a web that allows non-face-to-face payment under a web standard environment, a method for authentication and payment based on a web, a system for authentication and payment based on a web, and a non-transitory computer readable storage medium having a computer program recorded thereon.

2. Description of the Related Art

Use of wireless devices such as a mobile phone or a PDA (Personal Digital Assistant) have been rapidly increased with development of a mobile communication technology and the services based on the wired internet is being replaced by services based on the wireless internet.

With popularization of the wireless network, various services using wire/wireless networks have been provided even in commercial and service fields. For example, M-commerce (mobile-commerce), a mobile electronic business, is one of commerce services based on a wireless network.

It is required to paying through procedures of authentication and payment in order to perform non-face-to-face commerce. In the existing online payment systems made through authentication and payment, payment is made through individual authentication using a credit card number or a phone bill. According to the payment systems of the related art, a payment server cannot keep payment information such as credit card and transfer accounts, so Ansim Click or ISP credit card payment is used, or for simple payment, payment is made on the basis of virtual cards by mutual agreement between credit card companies and transfer service providers. The simple payment is also provided usually based on applications. There is no common standard for the online commerce.

PRIOR ART DOCUMENT

Patent Document

Korean Patent Application No. 10-2004-0062955 [Title: System and method for providing information of customer's purchase pattern to affiliated stores]

SUMMARY OF THE INVENTION

An object of the present invention is to provide an apparatus for authentication and payment based on a web for non-face-to-face payment under a web standard environment, a method for authentication and payment based on a web, a system for authentication and payment based on a web, and a non-transitory computer readable storage medium having a computer program recorded thereon.

Another object of the present invention is to provide an apparatus for authentication and payment based on a web for determining forgery in payment on the basis of a plurality of divided information blocks, a method for authentication and payment based on a web, a system for authentication and payment based on a web, and a non-transitory computer readable storage medium having a computer program recorded thereon.

Another object of the present invention is to provide an apparatus for authentication and payment based on a web for providing security against various types of infringements in payment through a user terminal, a method for authentication and payment based on a web, a system for authentication and payment based on a web, and a non-transitory computer readable storage medium having a computer program recorded thereon.

According to an aspect of the present invention, an apparatus of authentication and payment based on a web may include: a credit card permission request device that encodes and keeps a credit card number, divides a credit card authentication value into an information block 1 and an information block 2 by encoding the credit card authentication value such that the information block 1 is used for decoding the information block 2, transmits the information block 1 to a user authentication device, and deleting the information block 1; and a user authentication device that encodes the information block 1 on the basis of payment PIN (Personal Identification Number) information received from user equipment and keeps the encoded information block 1, and decodes the encoded information block 1 on the basis of the payment PIN information and transmits the information block 1 to the credit card permission request device, when there is a request from the credit card permission request device.

As an example of the present invention, when a transaction is generated through a web-based transaction device by a user, the user authentication device may receive a temporal virtual card number and information about payment details from the web-based transaction device, request the user equipment to send the payment PIN information for creating the information block 1, create a first transaction authentication value, using the information about payment details and member information, and transmit the first transaction authentication value to the credit card permission request device, and the credit card permission request device may determines whether there is forgery by comparing a second transaction authentication value made by itself with the first transaction authentication value, and request the user authentication device to send the information block 1, when there is no forgery.

As an example of the present invention, the credit card permission request device may decode the credit card authentication value and the credit card number encoded on the basis of the information block 1 and the information block 2 by decoding the information block 2 on the basis of the information block 1, create a permission message to transmit to a credit card company on the basis of the credit card authentication value and the credit card number, and transmit the permission message to the credit card company.

As an example of the present invention, encoding of the credit card number may be performed on the basis of an HSM (Hardware Security Module) and a Hash, encoding of the credit card authentication value may be performed on the basis of the HSM, and the information block 1 may be encoded through an AES (Advanced Encryption Standard) on the basis of the payment PIN information in the user authentication device.

As an example of the present invention, the credit card permission request device receives the credit card number and the credit card authentication value from a user equipment through a subscription procedure.

As an example of the present invention, when a transaction is generated through a web-based transaction device by a user, the user authentication device may receive a temporal virtual card number and information about payment details from the web-based transaction device, request the user equipment to send the payment PIN information for creating the information block 1, create a first transaction authentication value, using the information about payment details and member information, and transmit the first transaction authentication value to the web-based transaction server; the web-based transaction server may request the credit card permission request device to request payment permission by transmitting the payment details, the temporal virtual card number, and the first transaction authentication value to the credit card permission request device; and the credit card permission request device may determine whether there is forgery by comparing a second transaction authentication value made by itself with the first transaction authentication value, and request the user authentication device to send the information block 1, when there is no forgery.

According to another aspect of the present invention, a method for authentication and payment based on a web may include: encoding and keeping a credit card number by means of a credit card permission request device; dividing a credit card authentication value into an information block 1 and an information blocks 2 by encoding the credit card authentication value, by means of the credit card permission request device, the information block 1 being used for decoding the information block 2; transmitting the information block 1 to a user authentication device and deleting the information block 1 by means of the credit card permission request device; encoding the information block 1 on the basis of payment PIN (Personal Identification Number) information received from user equipment and keeping the encoded information block 1, by means of a user authentication device; and decoding the encoded information block 1 on the basis of the payment PIN information and transmits the information block 1 to the credit card permission request device by means of the user authentication device, when there is a request from the credit card permission request device.

As an example of the present invention, the method for authentication and payment based on a web may further include: receiving a temporal virtual card number and information about payment details from a web-based transaction device by means of the user authentication device, when a transaction is generated through the web-based transaction device by a user; requesting the user equipment to send the payment PIN information by means of the user authentication device; creating a first transaction authentication value, using the information about payment details and member information, and transmitting the first transaction authentication value to the credit card permission request device, by means of the user authentication device; determining whether there is forgery by comparing a second transaction authentication value made by the credit card permission request device with the first transaction authentication value, by means of the credit card permission request device; and requesting the user authentication device to send the information block 1, when there is no forgery.

As an example of the present invention, the method for authentication and payment based on a web may further include: decoding the credit card authentication value and the credit card number encoded on the basis of the information block 1 and the information block 2 by decoding the information block 2 on the basis of the information block 1, by means of the credit card permission request device; and creating a permission message to transmit to a credit card company on the basis of the decoded credit card authentication value and credit card number, and transmitting the permission message to the credit card company.

According to another aspect of the present invention, a computer program that can perform the method according to the embodiment may be kept in a non-transitory computer readable storage medium having a computer program recorded thereon.

According to another aspect of the present invention, A system for authentication and payment based on a web includes: an apparatus of authentication and payment including a credit card permission request device that encodes and keeps a credit card number, divides a credit card authentication value into an information block 1 and an information block 2 by encoding the credit card authentication value such that the information block is used for decoding the information block 2, transmits the information block 1 to a user authentication device, and deleting the information block 1, and a user authentication device that keeps information block 1 encoded on the basis of payment PIN (Personal Identification Number) information received from user equipment, and decodes the encoded information block 1 on the basis of the payment PIN and transmits the information block 1 to the credit card permission request device, when there is a request from the credit card permission request device; user equipment that transmits the credit card number and credit card authentication value to the user authentication device through a subscription procedure; and a web-based transaction server that, when a transaction is generated by the user equipment, creates and transmits information about a temporal virtual card number and payment details to the user authentication device, receives a first transaction authentication value created on the basis of the information about payment details and member information from the user authentication device, and transmits the first transaction authentication value to the credit card permission request device.

As an example of the present invention, the credit card permission request device may decode the credit card authentication value and the credit card number encoded on the basis of the information block 1 and the information block 2 by decoding the information block 2 on the basis of the information block 1, create a permission message to transmit to a credit card company on the basis of the decoded credit card authentication value and credit card number, and transmit the permission message to the credit card company, encoding of the credit card number may be performed on the basis of an HSM (Hardware Security Module) and a Hash, encoding of the credit card authentication value may be performed on the basis of an HSM (Hardware Security Module), and the information block 1 may be encoded through an AES (Advanced Encryption Standard) on the basis of the payment PIN information in the user authentication device.

The present invention can provide a method for authentication and payment based on a web for non-face-to-face payment in a web standard environment.

It is possible to whether there is forgery in payment on the basis of a plurality of divided information blocks, and it is possible to provide security against various types of infringements on payment performed by a user terminal.

Thereone, customers are allowed to conveniently and safely pay and a payment service following global web standards is provided, so payment based on the payment service according to an embodiment of the present invention can be performed in other countries.

DETAILED DESCRIPTION OF THE PREFERRED EMBODIMENTS

Figure 1:
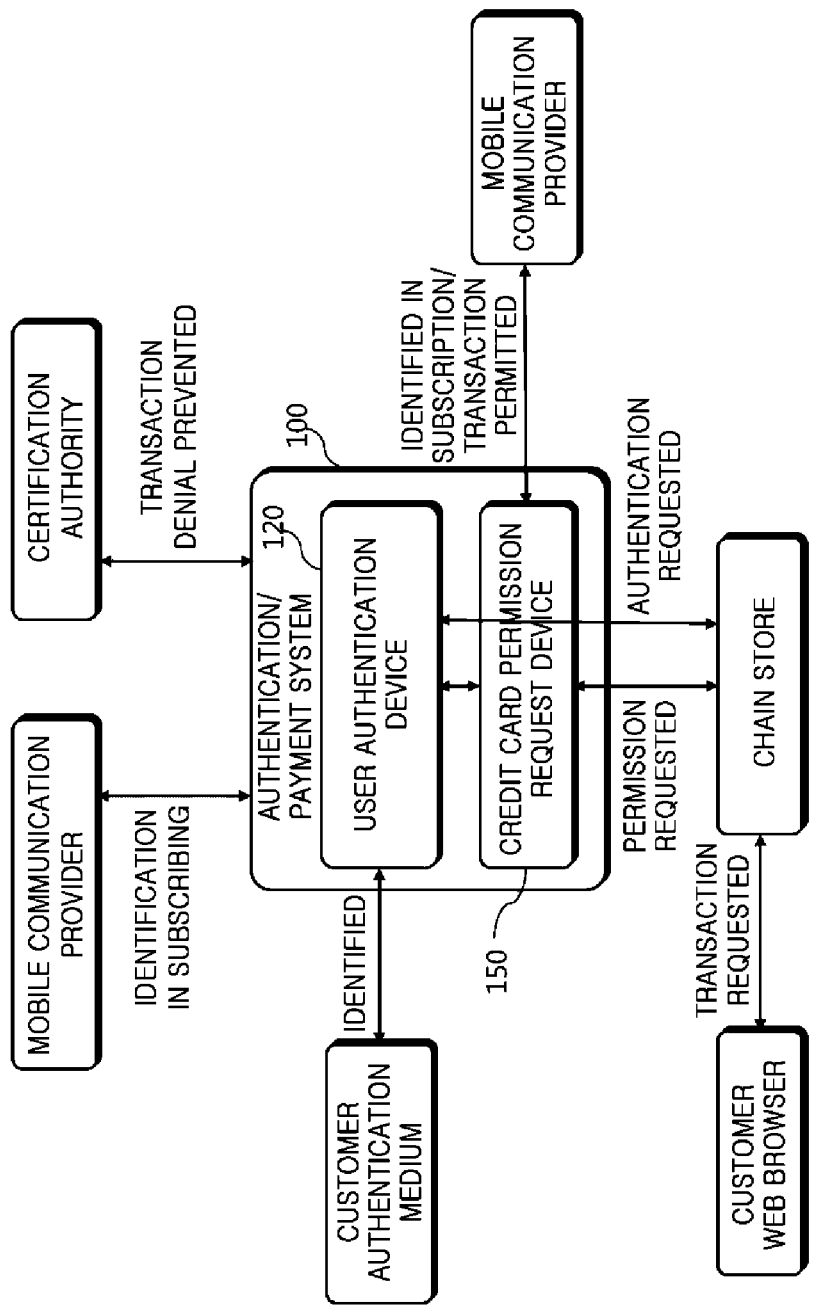
FIG. 1 is a conceptual diagram illustrating a method for authentication and payment based on a web according to an embodiment of the present invention.

It should be noted that technical terminologies used herein are used only in order to describe specific embodiments rather than limiting the present invention. Further, the technical terminologies used here should be construed as being generally understood by those skilled in the art unless defined as specific meanings, not construed as being excessively general meanings or excessively narrow meanings. Further, if the technical terminologies used herein are wrong technical terminologies that cannot exactly express the spirit of the present invention, they should be replaced by technical terminologies that can be correctly understood by those skilled in the art. Further, common terms used herein should be construed in accordance with dictionary definitions or contexts, not being as excessively narrow meanings.

The singular forms used herein are intended to include the plural forms as well, unless the context clearly indicates otherwise. Terms "composed of" or "include" used herein should not construed as necessarily including all of various components or various steps, but construed that they may not include some of the components or steps or may further include additional components or steps.

Further, terms including ordinal numbers such as 'first' and 'second' may be used to describe various components, but the components are not to be construed as being limited to the terms. The terms are used to distinguish one component from another component. For example, the 'first' component may be named the 'second' component, and vice versa, without departing from the scope of the present invention.

Hereinafter, embodiments of the present invention will be described in detail with reference to the accompanying drawings, like reference numerals are given to like or similar components regardless of the figure numbers, and repeated description is not provided.

Further, in describing the present invention, detailed descriptions of well-known technologies will be omitted so as not to obscure the description of the present invention with unnecessary detail. Further, it should be noted that the accompanying drawings are provided only for easier understanding of the spirit of the present invention and should not be construed as limiting the spirit of the present invention.

There has been a problem in the existing network-based payment method in that a payment server cannot keep payment information, so users have to input payment information every time. When payment is made on the basis of a virtual card number in simple payment in the related art, a payment provider has to define a payment standard through a private line with a specific card company, so it takes too much time to cooperate with all of card companies and banks and accordingly the service has been difficult to popularize.

Hereinafter, an embodiment of the present invention provides a payment service method considering convenience for customers in use and security and following global web standards.

The web standards mean international web standard technology established for compatibility of various operating environments without a specific plug-in, not depending on specific terminal operating environments (for example, ActiveX, Java, Adobe Air).

For example, web standards may be next generation open standards such as HTML5 established by W3C (World Wide Web Consortium).

In the following description, web standards stated in embodiments of the present invention are not limited to HTML5 standards may include various web driving technologies such as DOM and JavaScript for ensuring compatibility among various operating environments.

A method for authentication and payment based on a web according to an embodiment of the present invention to be described hereafter can improve inconvenience and risks such as inputting and transmitting sensitive personal information and payment information in every online authentication and payment, observing security required by domestic electronic finance transaction regulations to ensure convenience for customers in use and security.

Further, the method for authentication and payment based on a web according to an embodiment of the present invention, which is a payment service following global standards, may be used for identification transactions (3D authentication and payment) that is more stable by adding identification in common authentication transactions (2D authentication and payment) designed to satisfy global standards for enhancing service competitiveness.

Further, the method for authentication and payment based on a web according to an embodiment of the present invention can provide a common process considering expandability and compatibility to be able to provide authentication and permission services in transactions regardless of the platforms and OSs (operating system) of personal terminals.

Hereinafter, a method for authentication and payment based on a web according to an embodiment of the present invention is described in detail.

FIG. 1 is a conceptual diagram illustrating a method for authentication and payment based on a web according to an embodiment of the present invention.

Referring to FIG. 1, an authentication/payment system 100 may include specific lower devices that are physically separated. The authentication/payment system 100 may include a credit card permission request device 140 and a user authentication device 120.

The credit card permission request device 140 may be a server for performing authentication and transactions with credit card companies.

The user authentication device 120 may be a server in charge of identification of users. When a user subscribe through a chain store, the user authentication device 120 can perform identification of the user through SMS-OTP that is an identification service through a mobile phone provided by a mobile communication provider.

Further, the user authentication device 120 can receive credit card information from a user through a web browser and receive, keep, and manage a PIN (Personal Identification Number).

In detail, the user authentication device 120 can perform the following operations.

The user authentication device 120 can perform identification through a mobile communication provider or an iPin on the basis of personal information (name, birth date, sex, nationality, mobile phone number, mobile communication provider, and an email address) of a user that is received through a web browser in the process of registration of the user. CI (Connecting Information)/DI (Duplication Information) of personal information obtained through the identification all can be encoded and then kept and managed in a database of the user authentication device 120.

When a user logs in the user authentication device 120, the user authentication device 120 can create a temporal virtual card number by extracting credit card information (card ID) registered before by the user and encoding it with temporarily created encoding keys.

Further, the user authentication device 120 can encode and keep transaction environment information (accessed IP (Internet Protocol), location information, and User Agent) of a user, specifications (details) of a transaction, membership information, and payment information in a database.

Further, the user authentication device 120 can encode and keep an information block 1 transmitted from the credit card permission request device 140 (one information block from two items of information divided by obfuscating authentication values needed in permission of a credit card registered on the credit card permission request device 140 by a user) on the basis of a payment PIN inputted by a member.

Further, the user authentication device 120 can transmit the information block 1 decoded by the payment PIN inputted by the member when transaction permission was requested, to the credit card permission request device 140.

In detail, the credit card permission request device 140 can perform the following operations.

When a user registers a credit card for a service, information (credit card number, validity period, the first two digits of a card secret number, and birth date) for authentication of the credit card for asking whether the credit card was permitted to the credit card company in order to check whether the credit card is available can be temporarily transmitted to the credit card permission request device 140.

When the credit card permission request device 140 confirms availability of the credit card as a result of permission, information needed for credit card authentication is encoded by hardware through an HSM (Hardware Security Module) such as a common information processing procedure of VAN, and a card ID corresponding to the information can be created and kept in the credit card permission request device 140.

The validity period, the first two digits of a card secret number, and the birth date of the information needed for authentication of the credit card is obfuscated and divided into two information blocks and the two information blocks can be encoded by specific HSMs.

When each two information blocks are encoded, the value created by encoding the information block 1 with an HSM can be used as an encoding key for the information block 2. Accordingly, it the information block 1 is not given, access to the information blocks 2 is impossible, to sequential encoding can be performed.

In the created two information blocks, the information block 1 is transmitted to the user authentication device 120 and then may be deleted by the credit card permission request device 140.

An user equipment for performing the method for authentication and payment can perform an authentication and payment procedure through a web browser. A web browser that is driven in user equipment, which is a web browser supporting web standards, can receive input values (for example, a PIN and a phone number) needed for payment and authentication of the user and transmit the input value to the user authentication device through a security channel (for example, an SSL (Secure Socket Layer).

An authentication/payment application for performing the method for authentication and payment can be installed in the user equipment. For example, an authentication/payment application may be a web application based on JavaScript that provides security in non-face-to-face payment performed through a web browser.

Subscription of a new member, login, and authentication and payment based on an authentication image and a payment image can be performed and input information by a user can be processed through the authentication/payment application, and an authentication procedure and a payment procedure can be performed through the authentication/payment system 100.

The authentication/payment application can provide E2E security (protecting a period between a user and a server), a virtual keyboard (protecting input values by a user), and a function of obfuscating a page (encoding data on a webpage).

The following Table 1 lists measures of an authentication/payment application according to an embodiment of the present invention against types of infringement. The authentication/payment application according to an embodiment of the present invention can keep security in authentication and payment procedures in the ways of Table 1.

TABLE 1

| Types of infringement | Measures |
| --- | --- |
| Leakage of input information | Using virtual screen keyboard under web standards Encryption event library type |
| Forgery of webpage | Using dynamic obfuscation Making sure of source integrity by creating page source MAC |
| Malicious code | Checking antivirus application Making sure of guide and consent of user security program installation |

TABLE 1-continued

| Types of infringement | Measures |
| --- | --- |
| Access of unauthenticated user | Checking page session timeout<br>Checking user payment PIN in step of final payment |
| Illegal use of name of user | Doubly checking identification through mobile phone and credit card permission information<br>Checking whether CI of chain store account and authentication payment service account is the same |
| SMS phising (Smishing) | Using SMS-OTP only for user with account designated for payment<br>Using Callback URL PIN authentication for user of iOS |
| Repeated login | Checking failure rate of logging in chain store and authentication payment service<br>Shutting down account and sending it to user's email for five-time failures |
| Repeated input of PIN | Checking entire failure rate of PIN payment password<br>Stopping service and sending it to user's email for three-time failures |

Hereinafter, detailed examples of a subscribing procedure and a procedure of payment PIN authentication for performing the method of authentication and payment according to an embodiment of the present invention are described.

Figure 2:
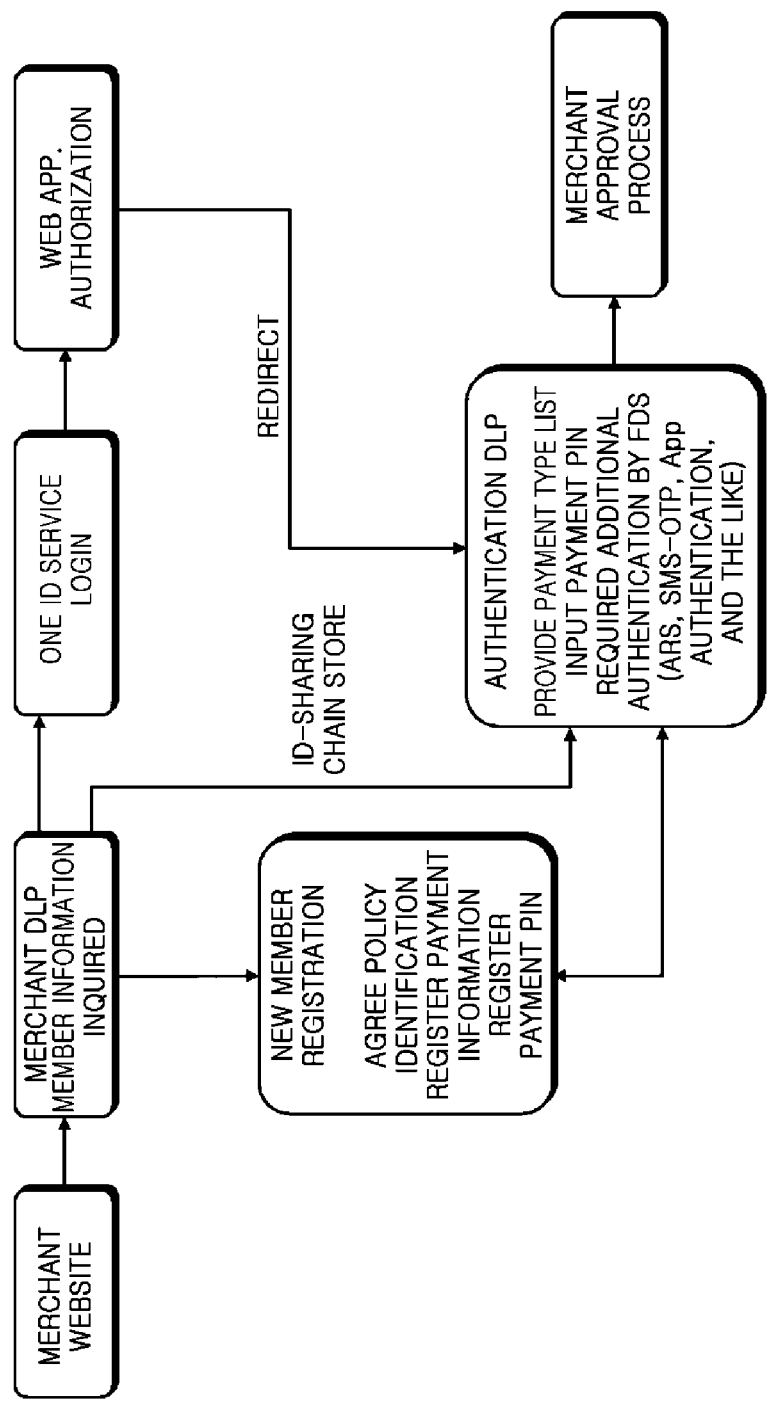
FIG. 2 is a conceptual diagram illustrating a subscribing procedure according to an embodiment of the present invention.

FIG. 2 is a conceptual diagram illustrating a subscribing procedure according to an embodiment of the present invention.

Referring to FIG. 2, when a user is already a member and a web-based transaction device (transaction web server) is an ID non-cooperative chain device, the user can perform authentication through a web application on the basis of a registered member ID and can be redirected to an authentication DLP (Data Loss Prevention) procedure. When an ID is shared between the web-based transaction device and another web-based transaction device, an authentication DLP can be performed on the basis of a shared ID through a membership information inquiry procedure.

In the authentication DLP procedure, a payment type list can be provided, and payment PIN input and additional authentication by an FDS (Fraud Detection System) (ARS (automatic response system), SMS (short message service)-OTP (one time password) and App authentication) can be performed.

When a user is not a member, he/she can go on with a new subscription procedure by agreeing a policy, identifying, registering payment information, and registering payment PIN.

When authentication is completed through the authentication DLP procedure, a permission procedure may be performed.

Figure 3:
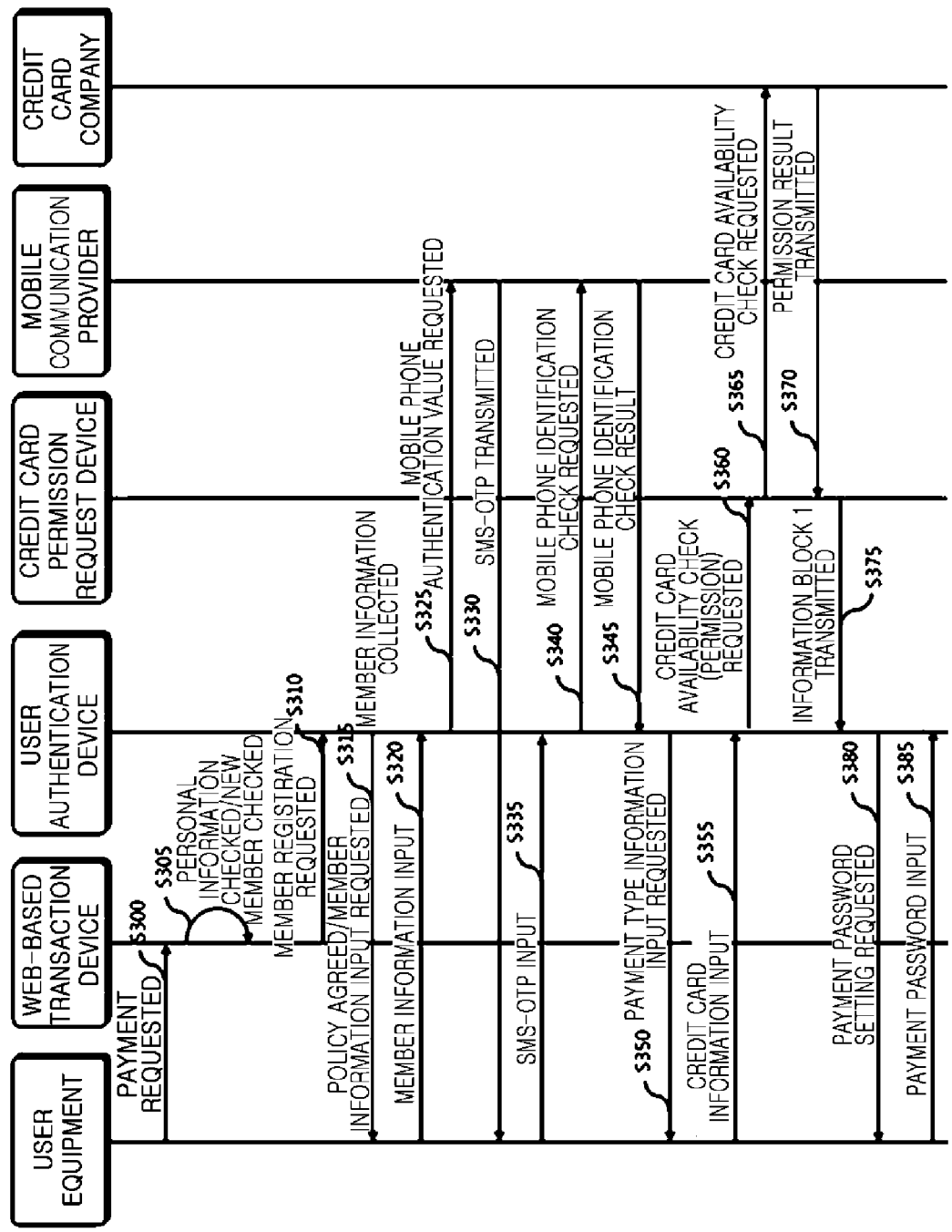
FIG. 3 is a flowchart illustrating a subscribing procedure according to an embodiment of the present invention.

FIG. 3 is a flowchart illustrating a subscribing procedure according to an embodiment of the present invention.

The user authentication device can receive an authentication payment service subscription request and member information from the user and identify the user through a mobile communication provider. Further, after the identification, the user registers a credit card (card number and CAV) through the user authentication device and the credit card permission request device. Availability of the credit card is confirmed and information for payment can be encoded and kept in the user authentication device and the credit card permission request device.

According to an embodiment of the present invention, it is possible to register a member account through identification information as in the following Table 2 in accordance with the features of a credit card of a member. All member accounts can be identified through both of an identification type provided non-financial companies and an identification type provided by financial companies.

TABLE 2

| Item | | Member using domestic card | Member using foreign card |
| --- | --- | --- | --- |
| Identification type | Non-financial company | Identifying mobile phone through mobile communication provider or Authenticating through iPin | Authenticating email account and Adding mobile phone identification (SMS-OTP) in accordance with risk of nations |
| | Financial Company | Checking availability of credit card | Checking availability of credit card |

Referring to FIG. 3, a user can request payment to a web-based transaction device (for example, a server operating the website of the representative chain store) (S300).

The user can select a simple payment method according to an embodiment of the present invention, as a payment method, through the web-based transaction device, and can request simple payment.

The web-based transaction device can inquire the subscription specifications of the user and check whether the user is a new member (S305). The web-based transaction device can determine whether the user requesting simple payment is a member who has been permitted of simple payment procedure on the basis of a member database. When a record of subscription of the user is in the member database, it can be determined that simple payment procedure can be performed for the user. In contrast, when there is no record of subscription of the user, it can be determined that the user cannot permitted of simple payment procedure and needs to newly subscribe to the simple payment procedure. Hereafter, a simple payment procedure for a user is described on the assumption that new subscription is required.

The web-based transaction device can request the user authentication device to proceed a new member registration procedure for a simple payment procedure. The user authentication device can check first availability of the web-based transaction device, which requested it to proceed a new member registration procedure, and can output a policy agreement image and a member information input image on a specific webpage and transmit it to user equipment.

The user equipment can agree the policy and input member information and payment PIN on the simple payment service page and transmit it to the user authentication device (S315). The user equipment can input member information (S320). The member information may include an email address, ID/password for services, and subscription information of user equipment (for example, a mobile terminal). The subscription information of the user equipment may include the identification number of the user equipment, a name, a birth date, sex, and nationality.

The user authentication device can send the identification information of the user equipment received from the user to a mobile communication provider through a mobile phone identification service agency (a credit rating company) (S325).

The mobile communication provider can transmit an SMS authentication number to the user equipment on the basis of the identification information of the user equipment received from the identification service agency (S330).

The user equipment can transmit the received SMS authentication number to the user authentication device (S335).

The user authentication device can request identification of the user by transmitting the received SMS authentication number to the mobile communication provider through the identification service agency (S340).

The mobile communication provider can transmit the result of identifying the user (for example, CI/DI) on the basis of the SMS authentication number received from the user authentication device to the user authentication device through the identification service agency (S345).

The user authentication device can request the user to input information about the payment type through the user equipment (S350). The user authentication device can provide user environment information including a screen keyboard and an antivirus program for important information and request the user to confirm it.

The user equipment can input the information about the payment type. The user equipment can transmit the credit card information to the user authentication device (S355). The credit card information transmitted to the user authentication device from the user equipment can be encoded by the encoding key provided from the credit card permission request device and then transmitted.

The user authentication device can transmit the encoded and transmitted credit card information of the user to the credit card permission request device (S360).

The credit card permission request device can decode the encoded and transmitted credit card information of the user and transmit a permission request message to the credit card company (S365).

The credit card company can check validity of the credit card information of the user through a permission department and transmit the permission result to the credit card permission request device (S370).

The credit card permission request device can encode the credit card number and the credit card authentication value on the basis of the result of permitting the credit card. For example, the credit card number can be encoded on the basis of an HSM and kept in the credit card permission request device. The credit card permission request device can create a card ID for recognizing the credit card number and keep them. Further, the credit card authentication value (valid period, the first two digits of a card secret number, and birth date) is divided into two parts of an information block 1 and an information block 2. The information block 1 can be transmitted to the user authentication device that is physically insulated (S375). The information block 1 can be deleted in the credit card permission request device after being transmitted to the user authentication device. As described above, the credit card permission request device can access the information block 2 on the basis of the information block 1 transmitted from the user authentication device.

As described above, the information block 1 can be encoded and kept in the user authentication device on the basis of the payment PIN inputted by the user.

The user authentication device can request the user equipment to send the payment PIN (S380) and the user equipment can encode the payment PIN and transmit it to the user authentication device (S385). The user authentication device can encode and keep the information block 1 on the basis of the payment PIN and delete the information block 1 before encoding.

Figure 4:
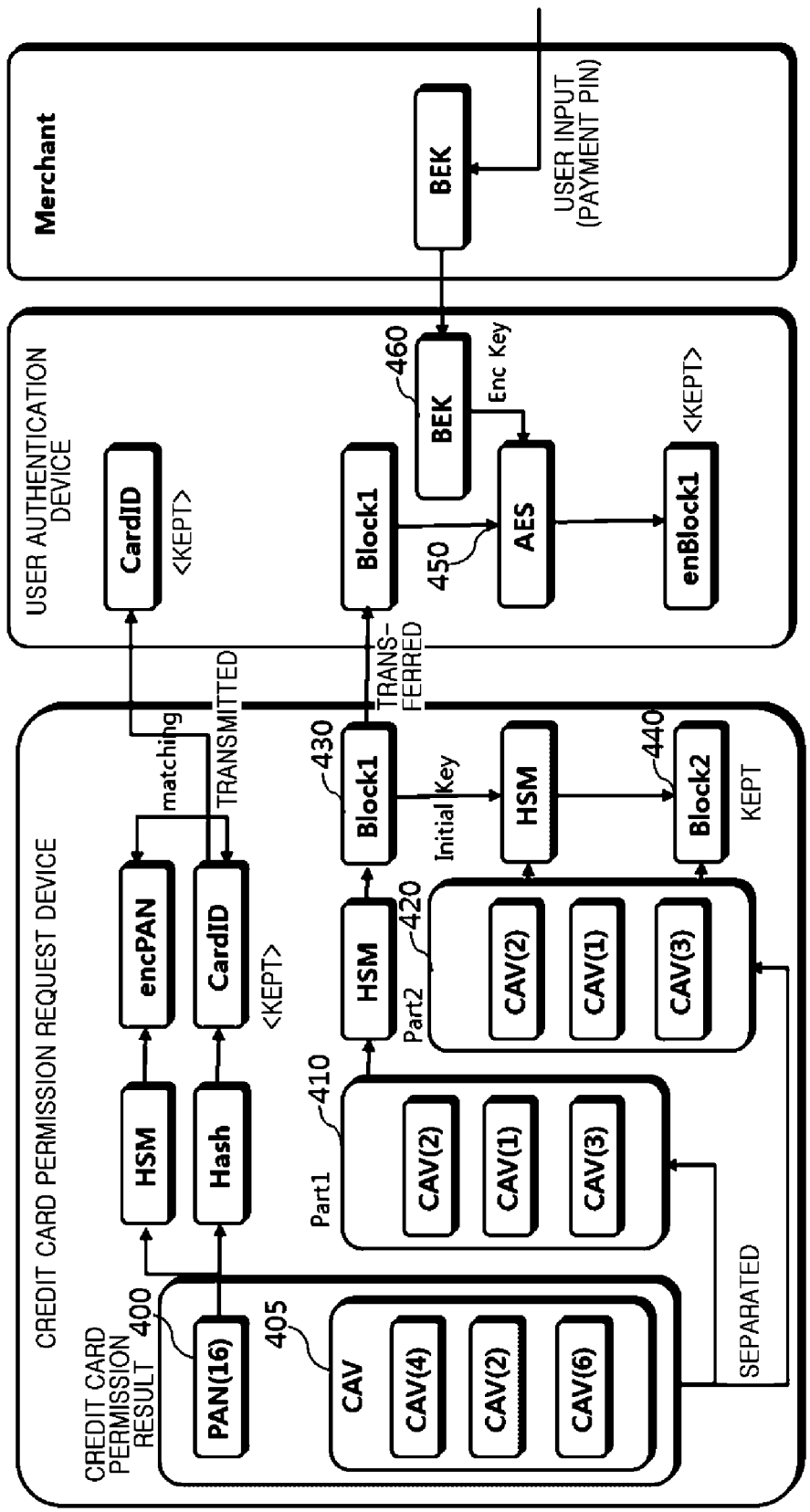
FIG. 4 is a conceptual diagram illustrating a method of encoding a credit card number and a credit card authentication value in a credit card permission request device according to an embodiment of the present invention.

FIG. 4 is a conceptual diagram illustrating a method of encoding a credit card number and a credit card authentication value in a credit card permission request device according to an embodiment of the present invention.

Referring to FIG. 4, a PAN (Primary Account Number) 400 of a credit card can be encoded on the basis of an HSM and a Hash.

The encoded PAN information can be matched with a card ID and kept in the credit card permission request device.

The card ID can be transmitted and kept in the user authentication device.

A CAV (Card Authentication Value) 405 of the credit card can be divided into a part 1 410 and a part 2 420. CAV information corresponding to the part 1 can be encoded on the basis of an HSM, created into information block 1 430, and transmitted to the user authentication device. The part 2 420 can be created into information block 2 440 obtained by encoding the information block 1 430 using an initial encoding value on the basis of the HSM.

The user authentication device can receive the information block 1 430 and encode it on the basis of an AES and a BEK (Block Encryption Key) 460 can be used for encoding the information block 1 430 on the basis of the AES 450. The BEK 460 may be a key created on the basis of a user's PIN inputted from a user equipment.

Figure 5:
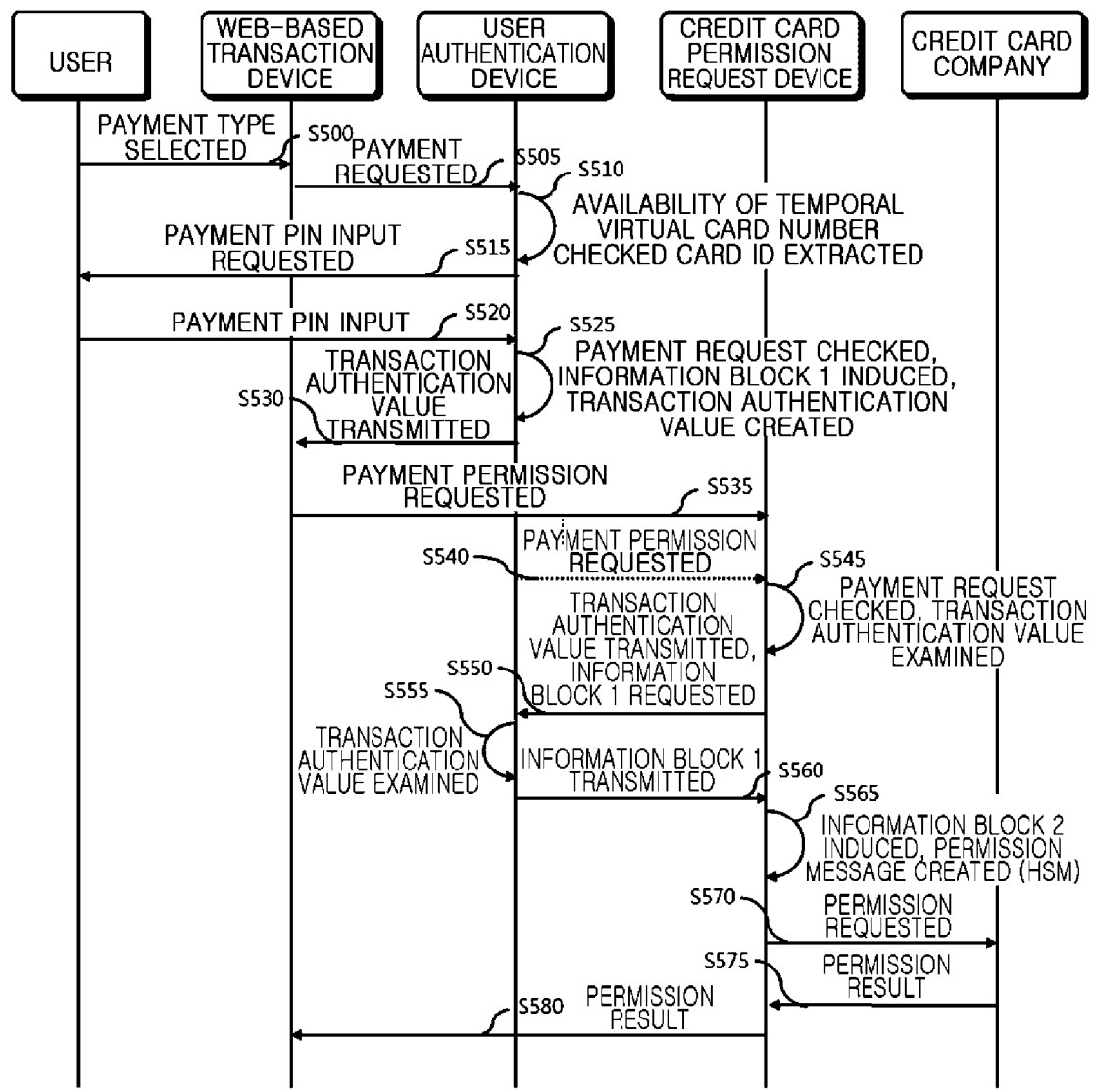
FIG. 5 is a flowchart illustrating a payment procedure based on input of a payment PIN according to an embodiment of the present invention.

FIG. 5 is a flowchart illustrating a payment procedure based on input of a payment PIN according to an embodiment of the present invention.

Referring to FIG. 5, when a simple payment procedure according to an embodiment of the present invention is selected (S500), the web-based transaction device can request the user authentication device to pay (S505). The web-based transaction device can perform a transaction authentication request by sending a temporal virtual card number selected by the user and the payment specifications (item, chain store name, the amount of money, the transaction date and time, and the like) to the user authentication device.

The user authentication device can check whether the temporal virtual card number has arrived within the transaction available time. Further, the user authentication device can acquire information about the card ID of the user by inquiring the information about the card ID of the user on the basis of the temporal virtual card number (S510).

The user authentication device can request the user equipment to input the information about the payment PIN set in subscription (S515). The user authentication device can provide an image for requesting the user equipment to input the payment PIN. Guide information about using a screen keyboard and an antivirus vaccine program for security of the payment IPIN to be inputted can be provided on the image for requesting the input of the payment PIN.

The user can input the payment PIN through the user equipment (S520).

The user authentication device can check the payment details (item, chain store name, the amount of money, transaction date and time, and the like) and decode information block 1 encoded and kept in subscription through the payment PIN of the member. Further, it is possible to create a transaction-shared disposable authentication value to prevent forgery in the transaction by the chain stores (S525).

The user authentication device can transmit the transaction-shared disposable authentication value to the web-based transaction device (S530).

The web-based transaction device can request payment permission by transmitting the payment details, the temporal virtual card number, and the transaction-shared disposable authentication value to the credit card permission request device (S535).

Instead of the steps S530 and S535, after as step SZ, the user authentication device can request payment permission to the credit card permission request device after identification succeeds (S540).

The credit card permission request device can create by itself a transaction-shared disposable authentication value using the payment details and the member information and compare the transaction-shared disposable authentication value created by itself with the transaction-shared disposable authentication value received from the web-based transaction device (S545). Whether there is forgery in the payment details received from the web-based transaction device can be examined on the basis of the comparing procedure.

The credit card permission request device can transmit the transaction authentication value to the user authentication device and request the information block 1 (S550).

The user authentication device can examine the transaction authentication value (S555), and then when the transaction authentication value is confirmed, it can transmit the information block 1 to the credit card permission request device (S560).

The credit card permission request device can decode the information block 2 on the basis of the information block 1 received from the user authentication device. The credit card permission request device can create authentication request information on the basis of the information block 1 and the information block 2 and transmit it to the credit card company (S565). For example, the authentication request information may a permission message created through hardware encoding equipment (HSM) on the basis of the information block 1 and the information block 2.

The credit card permission request device can transmit the authentication request information to the credit card company server (S570) and the credit card company server can receive the authentication request information and transmit the permission result to the credit card permission request device (S575). The credit card permission request device can transmit the permission result to the web-based transaction device (S580).

Figure 6:
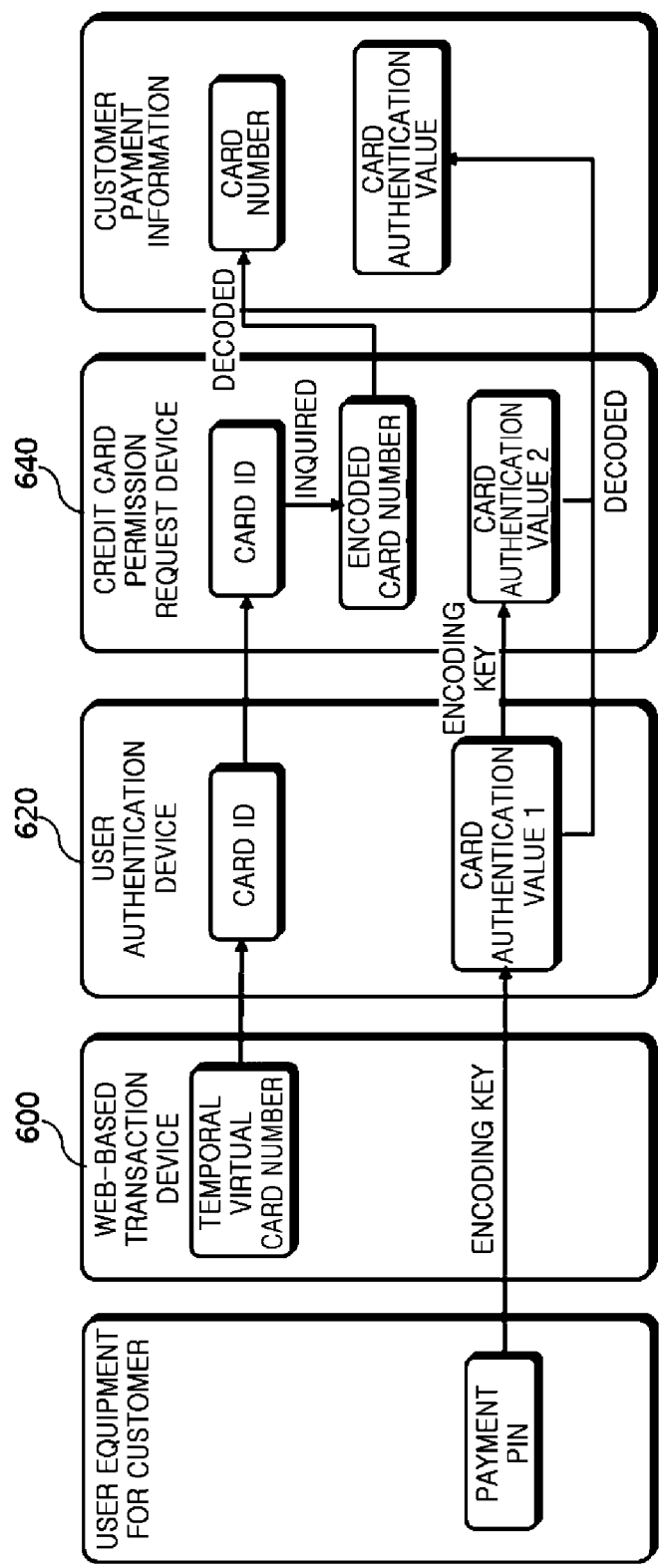
FIG. 6 is a conceptual diagram illustrating a payment procedure based on input of a payment PIN according to an embodiment of the present invention.

FIG. 6 is a conceptual diagram illustrating a payment procedure based on input of a payment PIN according to an embodiment of the present invention.

Referring to FIG. 6, a web-based transaction device 600 can perform a transaction authentication request by sending a temporal virtual card number selected by the user and the payment specifications (item, chain store name, the amount of money, the transaction date and time, and the like) to a user authentication device.

The user authentication device 630 can acquire information about the card ID of the user by inquiring the information about the card ID of the user on the basis of the temporal virtual card number. The information about the card ID of the user can be transmitted to a credit card permission request device 640. The credit card permission request device 640 can inquire an encoded card number on the basis of the information about the card ID, decode the encoded card number, and use it as payment information of a customer. The decoding the encoded card number in the credit card permission request device 640 can be performed on the basis of information block 2 decoded on the basis of information block 1 received from the user authentication device.

The user authentication device 620 can request a user equipment to input the information about the payment PIN set in subscription. The user can input the payment PIN through the user equipment.

The user authentication device 620 can decode the information block 1 encoded and kept in subscription, through a payment PIN of a member.

The credit card permission request device 640 can transmit a transaction authentication value to the user authentication device 620 and request the information block 1. The user authentication device 620 examines the transaction authentication value, and when the authentication value is confirmed, it can transmit the information block 1 to the credit card permission request device 640.

The credit card permission request device 640 can decode the information block 2 on the basis of the information block 1 received from the user authentication device 620. The credit card permission request device 640 can create a card authentication value by decoding the information block 2.

For example, the credit card permission request device 640 can create authentication request information on the basis of the information block 1 and the information block 2 and transmit it to the credit card company. For example, the authentication request information may a permission message created through hardware encoding equipment (HSM) on the basis of the information block 1 and the information block 2.

The credit card permission request device 640 can transmit the authentication request information to the credit card company and a credit card company can receive the authentication request information and transmit the permission result to the credit card permission request device. The credit card permission request device 640 can transmit the permission result to the web-based transaction device.

The apparatus for authentication and payment based on a web, the method for authentication and payment based on a web, and the a system for authentication and payment based on a web can be achieved by computer programs, and codes and code segments of the computer programs can be easily inferred by computer programmers in the field. Further, the computer program is stored in non-transitory computer readable storage media, and read and executed by a computer or the credit card permission request device, the user authentication device, the user equipment, and the web-based transaction server according to an embodiment of the present invention, so the method for authentication and payment based on a web can be implemented.

The non-transitory computer readable storage media include a magnetic recording medium, an optical recording medium, and a carrier wave medium. A computer program for achieving the apparatus for authentication and payment based on a web, the method for authentication and payment based on a web, and the a system for authentication and payment based on a web according to an embodiment of the present invention may be stored and installed in a user equipment. Alternatively, an external memory such as a smart card, in which a computer program for achieving the apparatus for authentication and payment based on a web, the method for authentication and payment based on a web, and the a system for authentication and payment based on a web according to an embodiment of the present invention are stored and installed, may be mounted on user equipment through an interface.

It should be understood that the present invention may be changed and modified by those skilled in the art without departing from the scope of the present invention. Accordingly, the embodiment described herein are provided not to limit, but to explain the spirit of the present invention and the spirit and the scope of the present invention are not limited by the embodiments. The protective range of the present disclosure should be construed on the basis of claims and all the technical spirits in the equivalent range should be construed as being included in the scope of the right of the present disclosure.

The present invention can provide a method for authentication and payment based on a web for non-face-to-face payment in a web standard environment. It is possible to whether there is forgery in payment on the basis of a plurality of information blocks divided and transmitted to different devices, and it is possible to provide security against various types of infringements on payment performed by a user terminal. Since a payment service is provided with high security in a web standard environment, so consumers can perform payment on the basis of the method for authentication and payment based on a web according to an embodiment of the present invention.

What is claimed is:

1. A system of authentication and payment for a transaction generated through a web-based transaction device, comprising:
   a first processor;
   a first memory storing first instructions thereon, the first instructions when executed by the first processor cause the first processor to:
      encode and store a credit card number,
      divide a credit card authentication value into an information block 1 and an information block 2 by encoding the credit card authentication value, wherein the information block 1 is used for decoding the information block 2, and the credit card authentication value includes at least one of a valid period of a credit card, first two digits of a card secret number, and a birth date,
      transmit the information block 1 to a second processor, and
      delete the information block 1; and
   the second processor; and
   a second memory storing second instructions thereon, the second instructions when executed by the second processor cause the second processor to:
      encode the information block 1 on the basis of payment PIN (Personal Identification Number) information received from user equipment and stores the encoded information block 1, and
      decode the encoded information block 1 on the basis of the payment PIN information and transmit the information block 1 to the first processor, responsive to a request from the first processor,
   wherein responsive to the request provided to the second processor, the first processor receives the information block 1 from the second processor and decodes the credit card authentication value encoded on the basis of the information block 1 and the information block 2, by decoding the information block 2 on the basis of the received information block 1,
   wherein when the transaction is generated through the web-based transaction device, the second processor receives a temporal virtual card number and information about payment details from the web-based transaction device, requests the user equipment to send the payment PIN information for decoding the information block 1, creates a first transaction authentication value using the information about payment details and member information, and transmits the first transaction authentication value to the first processor, wherein the member information includes an email address, and
   the first processor determines there is forgery by comparing a second transaction authentication value made by the first processor with the first transaction authentication value, and requests the second processor to send the information block 1, responsive to determining there is no forgery.

2. The system of claim 1, wherein the first processor creates a permission message to transmit to a credit card company on the basis of the credit card authentication value and the credit card number, and transmits the permission message to the credit card company.

3. The system of claim 2, wherein encoding of the credit card number is performed on the basis of an HSM (Hardware Security Module) and a Hash,
   encoding of the credit card authentication value is performed on the basis of the HSM, and
   the information block 1 is encoded through an AES (Advanced Encryption Standard) on the basis of the payment PIN information in the second processor.

4. The system of claim 3, wherein the first processor receives the credit card number and the credit card authentication value from the user equipment through a subscription procedure.

5. A method for authentication and payment for a transaction generated through a web-based transaction device, comprising:
   encoding and storing, by a credit card permission request device, a credit card number;
   dividing, by the credit card permission request device, a credit card authentication value into an information block 1 and an information blocks 2 by encoding the credit card authentication value, wherein the information block 1 is used for decoding the information block 2, and the credit card authentication value includes at least one of a valid period of a credit card, first two digits of a card secret number, and a birth date;
   transmitting, by the credit card permission request device, the information block 1 to a user authentication device and deleting the information block 1;
   encoding, by the user authentication device, the information block 1 on the basis of payment PIN (Personal Identification Number) information received from user equipment and storing the encoded information block 1;
   receiving, by the user authentication device, a temporal virtual card number and information about payment details from a web-based transaction device, when the transaction is generated through the web-based transaction device;
   requesting, by the user authentication device, the user equipment to send the payment PIN information;
   creating, by the user authentication device, a first authentication value using the information about payment details and member information, and transmitting the first transaction authentication value to the credit card permission request device, wherein the member information includes an email address;

determining, by the credit card permission request device, there is forgery by comparing a second transaction authentication value made by the credit card permission request device with the first transaction authentication value;

requesting, by the credit card permission request device, the user authentication device to send the information block 1, when there is no forgery;

decoding, by the user authentication device, the encoded information block 1 on the basis of the payment PIN information and transmits the information block 1 to the credit card permission request device, when there is the request from the credit card permission request device; and decoding, by the credit card permission request device, the credit card authentication value encoded on the basis of the information block 1 and the information block 2 by decoding the information block 2 on the basis of the information block 1.

6. The method of claim 5, further comprising:

creating, by the credit card permission request device, a permission message to transmit to a credit card company on the basis of the decoded credit card authentication value, and transmitting the permission message to the credit card company.

* * * * *